April 18, 1939.  S. F. FRENCH  2,154,502
HOLLOW ELECTRIC CONDUCTOR
Filed April 9, 1935
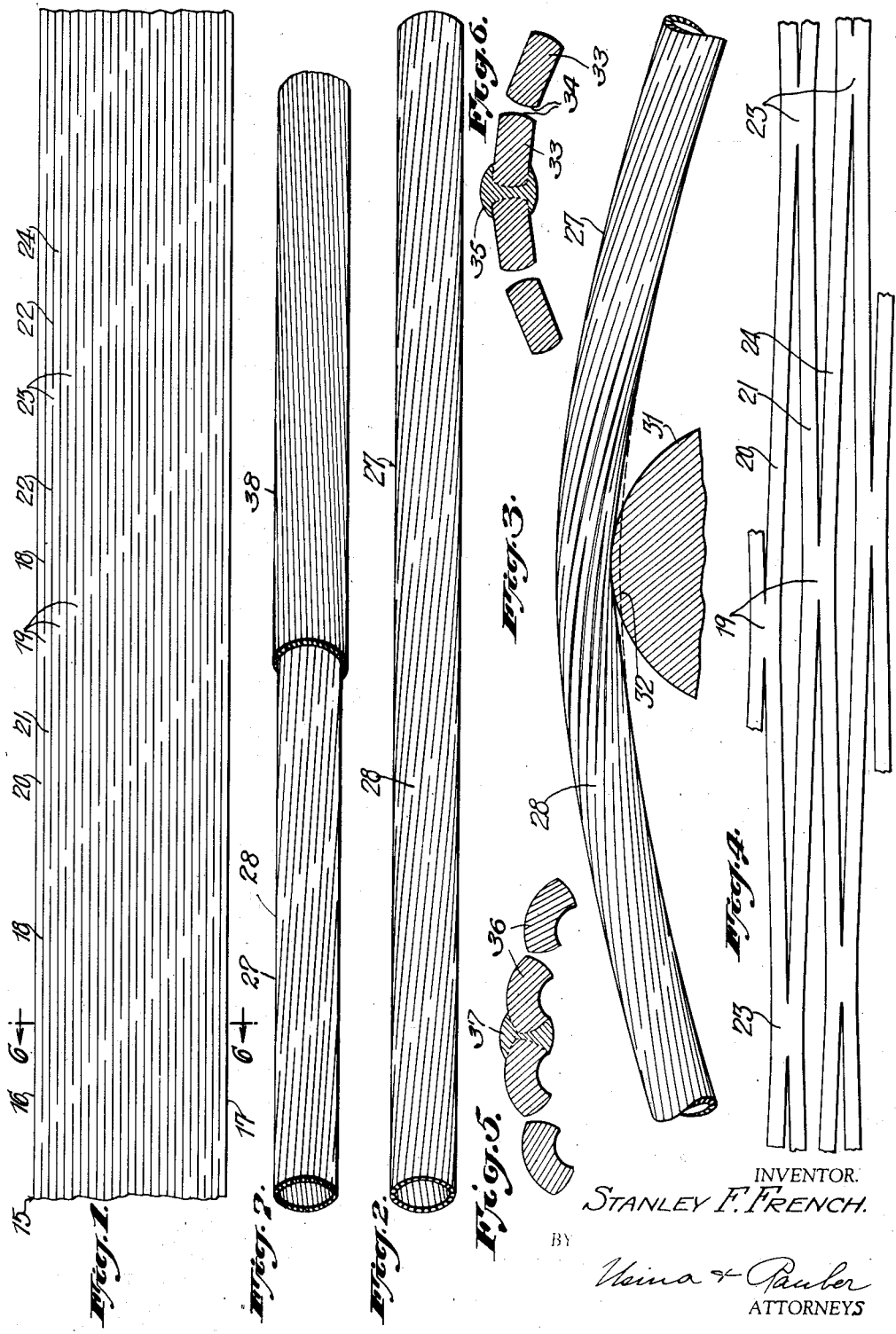
INVENTOR.
STANLEY F. FRENCH.
BY
ATTORNEYS Patented Apr. 18, 1939

2,154,502

UNITED STATES PATENT OFFICE 2,154,502

HOLLOW ELECTRIC CONDUCTOR

Stanley F. French, Dobbs Ferry, N. Y., assignor to Anaconda Wire & Cable Company, New York, N. Y., a corporation of Delaware Application April 9, 1935, Serial No. 15,395

6 Claims. (Cl. 174—130)

Heretofore flexible hollow electric conductors have been formed of longitudinal elements, generally having a slight helical twist, relatively slidable longitudinally but rigid circumferentially. For example, they have been made of longitudinal elements that have been interlocked to form a tube that is sufficiently rigid or stiff to avoid collapsing. Other types of hollow conductors have been formed by wires or strands laid helically side by side on an inner supporting structure. These, and similar constructions of the prior art, have the disadvantage that if they are sharply flexed, sufficiently to become distorted to any considerable extent, the distortion is permanent, and may destroy the usefullness of the conductor. For example, the unsupported weight of a heavy hollow conductor passing over a guide pulley in laying or suspending the cables during installation may cause a sharp bend which will collapse or impair the hollow structure to such an extent as to render it useless or unsatisfactory as a conductor. For this reason hollow conductors as heretofore constructed have required elaborate and somewhat extensive precautions to prevent any such partial distortion or collapsing of the tubular or hollow construction.

My present invention provides a hollow conductor, and a method of making the same, which will resume its normal shape after being bent or distorted relatively sharply.

In my invention, a number of longitudinal or slightly helical metallic elements, usually copper or aluminum, are arranged in a tubular or cylindrical structure and united at longitudinally spaced intervals, each element being united to the element on one side at a different longitudinal interval than its union to the element on the opposite side, so as to form a staggered break-joint type of structure. With the elements thus united and formed into a cylindrical shape, a distorting force applied at any point, tends to bend the particular element or elements against which it is applied freely and independently of the immediately adjacent elements. The bending of any element under this force is transmitted lengthwise to its union with the adjacent elements and thence back so that there is a transmission of the bending and bending force to the adjacent elements, only through a relatively long length of the elements. This is in contrast to the condition or situation that would arise if a distorting stress were applied to a tubular structure in which the elements were joined or supported throughout their contacting edges, as in a dove-tailed or interlocked structure, because in this case the bending stresses would be transmitted sidewise and tend to give a permanent set and distortion to the structure. Such rigid structures as those of the prior art will be readily distorted beyond the elastic limit of the metal, whereas in applicant's structure, the stresses being transmitted through relatively long lengths of the elements which act in the manner of a leaf spring or set of leaf springs cause no permanent set.

Applicant's structure may be formed from flat sheet metal or strip having a number of successive or aligned longitudinal slits in parallel spaced relation to divide the sheet or strip into a number of longitudinal elements. The slits of any longitudinal section, that is, those in alignment, are separated at intervals and are not continuous so that there is a bridge of metal, between successive slits, from one element to the other. These interruptions in the slits or bridging of the elements, are staggered longitudinally, with the interruption or interval between two successive aligned slits, being at about the midpoints of the slits at either side thereof. This results in a lattice-like construction, except that the slits being very narrow, merely separate the elements physically without spacing them. The intervals between slits may be so arranged as to lie in successive zones, or may be so arranged as to lie in spiral configuration. When the strip is shaped to tubular form, its adjacent edges are integrally joined at appropriate intervals, as for example by welding.

The structure may also be made of separate individual strands or wires of any suitable cross-section, welded or otherwise secured at intervals to correspond with the interruptions of the slits in the structure formed from sheet or strip. The structure formed by any of the above methods may serve as a support for an outer covering of wire strands or may be used without such covering. The separate or individual strands where formed from a sheet, or from sealing a flat sheet or strip, may be of any suitable cross-section, such as flat or circular, or may be concave inwardly to give them an increased rigidity or stiffness. The individual strands or elements may be formed straight as longitudinal elements of a cylindrical structure, or may be given a slightly spiral twist. Similarly, in shaping the slitted sheet material, it may be shaped about a mandrel with the slits running longitudinally, or may be wound in a slightly spiral relation to give a spiral twist to the elements.

The various features of the invention are illustrated in the accompanying drawing, in which:

Fig. 1 is a plan view of a flat strip or sheet slit appropriately to form the elements when the sheet is bent to a cylindrical structure; Fig. 2 is formed by shaping or wrapping the sheet or strip of Fig. 1, in a slightly spiral manner to form helically positioned elements; Fig. 3 is a side view of the construction of Fig. 2 bent sharply over a pulley and showing the manner of distortion; Fig. 4 is a face or development view of a part of the conductor showing the manner in which the various elements may separate or bend freely upon distortion; Figs. 5 and 6 are enlarged cross-section of elements showing modifications of form of the latter; Fig. 7 is a view of a conductor similar to that of Fig. 2 and having an overlying layer of wire strands.

Referring more particularly to Fig. 1 of the accompanying drawing, a metallic sheet 15 having side edges 16 and 17 is slit longitudinally by a number of longitudinal slits 18 interrupted at suitable and preferably regular intervals 19. There is thus formed successive elements 20 and 21 separated at intervals by the slits 18 and joined side by side through the intervals 19. A second set of slits 22 with interruptions 23 are then formed parallel to and spaced from the slits 18 to separate the element 21 from the next adjacent element 24, the elements 21 and 24 being separated throughout certain lengths by the slits 22 and united at the intervals 23. The interval 23 is at about the mid-point of the slit 18. This slitting is carried across the entire width of the sheet to form successive elements 20, 21 and 24, separated by the successive slits and joined at longitudinally staggered or offset intervals.

The intervals 19 may be arranged to lie in diagonal zones across the sheet or strip 15 and the intervals 23 in longitudinally spaced parallel diagonal zones with the zone at one edge of the sheet at approximately the same longitudinal longitude as the end of the successive strip at the opposite edge.

The sheet thus slit is then bent to cylindrical form with the side edges 16 and 17 brought into abutment or contact. These abutting or contacting edges are then integrally united as by appropriate welds at intervals to complete the staggered union of the elements at these edges in accordance with the pattern of the intervals between slits. This will cause all joining intervals to lie in a continuous spiral zone.

In bending the sheet to a cylindrical shape the sheet may be wrapped or formed with the side edges 16 and 17 at an angle to a line parallel with the axis of the tubular structure, so as to give the slits and elements and the side edges 16 and 17 a slightly helical twist as in the hollow conductor 27 illustrated in Fig. 2. In each case the intervals between the slits and accordingly the union of alternate pairs of elements will lie in helical zones 28.

The relation of the slits and elements and intervals of joining, is shown in somewhat exaggerated form and arrangement and at a larger scale in Fig. 4. In this figure, the element 20 is shown as distorted at, for example, the interval 19. This distortion is not imparted directly to the adjacent strands, but the element 21 is permitted to bend between the intervals 23 as a spring would bend and as 23 are not rigidly fixed, these may be displaced transmitting their displacement in the manner of a double leaf spring to the element 21 and through the latter to the next area of junction 19 and thence throughout the circumference of the conductor.

Assuming, for example, that a strand or group of strands is pressed inwardly as in passing over a guide pulley, indicated at 31 in Fig. 3, for distance represented as that between the dotted line 32 representing the normal shape of the conductor and the periphery of the pulley 31. This distortion will be distributed until it reaches the point or interval of joining to the adjacent strand. This distribution of the distortion throughout a considerable length, avoids any sharp creasing or bending, such as might occur if the distortion were transmitted directly in a circumferential direction. Accordingly when the distorting force or stress is removed, the conductor will resume its original shape.

It will be apparent that instead of slitting a sheet, as indicated above, a number of metallic elements may be assembled side by side and joined at the appropriate staggered intervals 20 and 23, then assembling into a cylindrical shape. Or, that the elements may be first assembled in the cylindrical shape and then welded at the appropriate intervals while in this shape. Such welding is indicated in the partial cross-sections shown in Figs. 5 and 6.

In assembling the individual elements and then welding an element of any suitable or selected cross-section may be used. The elements may be of a flat or strip construction, such as the elements 33 of Fig. 6, with suitably rounded edges 34 and welded, as indicated at 35, in the appropriately positioned intervals. Or, the flat elements, such as those of Fig. 6, may be convexed outwardly as indicated in the elements 36 of the modification shown in Fig. 5, and welded as at 37. Such configurations may be given to the elements of a single sheet during the slitting operation.

Any of the above types of hollow structures may be covered by a layer of strands 38, arranged in slightly helical configuration as shown in Fig. 7. As these strands are free and independent of one another, they may readily distort with the underlying structure of the tube 27 and be free to resume their normal shape with the latter.

It will be understood that the above embodiments are given merely by way of example and that other methods of uniting elements arranged in a cylindrical conformation, so as to arrange staggered unions and give the spring action upon distortion may be employed.

Through the above construction, I provide a cylindrical structure in which a distortion applied to any particular element or adjacent elements, is transmitted through a lattice-like arrangement with a spring action. This enables the various elements to resume their normal shapes when the distorting force is removed.

What I claim is:

1. A hollow conductor comprising a number of conductor elements arranged side by side to form a cylinder, each said element extending helically in the cylinder thus formed, said elements being integrally united at intervals, said intervals being staggered so that the union of each element to the adjacent element at one side is intermediate its union to the element on the opposite side.

2. A hollow conductor comprising a number of conductor elements arranged side by side to form a cylindrical structure in which said elements extend helically, the side edges of each element being integrally united at intervals to a side edge of each of the adjacent elements, the unions with an element at one side being intermediate the unions to the element at an opposite side of each element so as to provide a staggered series of unions about the cylindrical structure.

3. The conductor of claim 1 in which said elements are integrally joined by welding.

4. The conductor of claim 1 in which the elements are formed of a single sheet of metal slit into elements except at the intervals where said elements are joined.

5. The conductor of claim 1 in which the elements are convex outwardly.

6. The conductor of claim 1 in which alternate elements are joined at intervals which lie in a helix about the cylindrical structure.

STANLEY F. FRENCH.